(12) United States Patent
Lauther

(10) Patent No.: US 8,005,111 B2
(45) Date of Patent: Aug. 23, 2011

(54) METHOD FOR THE PHASE-RELATED SCHEDULING OF DATA FLOW IN SWITCHED NETWORKS

(75) Inventor: Ulrich Lauther, München (DE)

(73) Assignee: Siemens Aktiengesellschaft, Muenchen (DE)

(*) Notice: Subject to any disclaimer, the term of this patent is extended or adjusted under 35 U.S.C. 154(b) by 384 days.

(21) Appl. No.: 11/989,824

(22) PCT Filed: Jul. 19, 2006

(86) PCT No.: PCT/EP2006/064418
§ 371 (c)(1),
(2), (4) Date: Jan. 31, 2008

(87) PCT Pub. No.: WO2007/014856
PCT Pub. Date: Feb. 8, 2007

(65) Prior Publication Data
US 2009/0231996 A1 Sep. 17, 2009

(30) Foreign Application Priority Data
Aug. 1, 2005 (DE) .................. 10 2005 036 064

(51) Int. Cl.
*H04B 7/212* (2006.01)
(52) U.S. Cl. ................. 370/442; 370/229
(58) Field of Classification Search ............ 370/431, 370/441, 442, 503, 229
See application file for complete search history.

(56) References Cited

U.S. PATENT DOCUMENTS

| | | | |
|---|---|---|---|
| 5,301,055 A * | 4/1994 | Bagchi et al. | 398/54 |
| 5,974,439 A * | 10/1999 | Bollella | 718/104 |
| 6,310,563 B1 * | 10/2001 | Har et al. | 341/50 |
| 6,456,633 B1 * | 9/2002 | Chen | 370/490 |
| 2001/0002195 A1 | 5/2001 | Cruz | |
| 2004/0233905 A1 * | 11/2004 | Weber | 370/389 |
| 2005/0002413 A1 | 1/2005 | Lauther | |
| 2005/0243835 A1 * | 11/2005 | Sharma et al. | 370/395.42 |
| 2007/0002750 A1 * | 1/2007 | Sang et al. | 370/238 |

FOREIGN PATENT DOCUMENTS

| | | |
|---|---|---|
| EP | 1 185 044 A2 | 3/2002 |
| WO | WO 02/100023 A2 | 12/2002 |
| WO | WO 03/039082 A1 | 5/2003 |

OTHER PUBLICATIONS

Ravinda K. Ahuja, Thomas L. Magnanti, James B. Orlin: "Network Flows", Theory, Algorithms and Applictions, 1993, pp. v-x, pp. 43-46, pp. 176-180, pp. 308-315, Prentice Hall, Englewood Cliffs, New Jersey.

* cited by examiner

Primary Examiner — Ricky Ngo
Assistant Examiner — Kan Yuen

(57) ABSTRACT

There is described a method for communicating a real-time data traffic in a collision-preventing communications network, during which the following steps are carried out before a real-time data traffic, which is composed of real-time messages and which cyclically recurs within a macro cycle composed of successive cycles: routing the cyclically recurring real-time data traffic for determining optionally the most economical data paths for the real-time messages in communications network; scheduling the cyclically recurring real-time data traffic based on the determined data paths for establishing transmit times for the real time messages within the cycles; subdividing the macro cycle into k phases, k being a natural number >1, and; assigning a respective real-time message to a phase.

15 Claims, 10 Drawing Sheets

Capacity = 1
Costs low

Capacity unlimited
Costs high

METHOD FOR THE PHASE-RELATED SCHEDULING OF DATA FLOW IN SWITCHED NETWORKS

CROSS REFERENCE TO RELATED APPLICATIONS

This application is the US National Stage of International Application No. PCT/EP2006/064418, filed Jul. 19, 2006 and claims the benefit thereof. The International Application claims the benefits of German application No. 10 2005 036 064.5 DE filed Aug. 1, 2005, both of the applications are incorporated by reference herein in their entirety.

FIELD OF INVENTION

The invention is based on the technical area of communication networks and relates in particular to a method for communicating a real-time data traffic in a communication network that avoids collisions due to prior planning, e.g. the real-time Ethernet protocol, wherein a real-time data traffic is effected by way of a conventional Ethernet network in a deterministic, in other words predictable, manner. The invention also extends to a storage medium for data processing devices with commands stored thereon for the implementation of such a method, as well as on a communication network, in which such a method operates.

BACKGROUND OF INVENTION

In modern communication networks, as deployed for example in the field of automation, it is necessary for messages to be exchanged quickly between parts (switching elements) of the communication network, such as the control system, drives, sensors, etc. This exchange can take place in particular in a collision-free manner and therefore in a real time-compatible manner, if the path of each message through the network connecting the system components of the communication system and the send times of the messages are determined beforehand. In this manner the arrival time of the message at each switching element is known a priori and the switching element can forward the message according to the planned path, without addresses having to be interpreted or conflicts having to be resolved.

Of importance for such a procedure is a planning tool, which automatically determines and in particular optimizes message paths through the communication network (routing). The purpose of optimization here is to minimize the processing time for the overall message time.

A method as described above in a collision-recognition based network is disclosed in the PCT application WO 03/039082 A1. One disadvantage of the method indicated there is however that each message is sent just once per processing cycle, which results in sub-optimal utilization of the available bandwidth.

SUMMARY OF INVENTION

In contrast an object of the present invention is to indicate a method for communicating a real-time data traffic in a collision-avoiding communication network, by means of which it is possible to achieve better utilization of the available bandwidth.

According to the proposed invention, this object is achieved by a method with the features of an independent claim. Advantageous refinements of the invention are indicated by the features of the subclaims.

According to the invention a method is indicated for communicating a real-time data traffic in a collision-avoiding communication network, wherein the steps set out below are implemented temporally before a cyclically recurring real-time data traffic (for example even during the configuration phase of the communication network). The cyclically recurring real-time data traffic takes place here within a macrocycle, which is made up of successive cycles, in which one or more real-time messages of the real-time data traffic is/are sent and/or received. In the inventive method a routing of the cyclically recurring real-time data traffic is first implemented to determine data paths for the real-time messages in the communication network. In this process economical data paths in particular can be determined. After that a scheduling of the cyclically recurring real-time data traffic is implemented based on the determined data paths, in order thereby to establish send times for the real-time messages within the cycles. The macrocycle is also subdivided into k phases, where k is a natural number>1 and each of the real-time messages of the real-time data traffic is assigned a phase. By allocating a respective real-time message to a phase, it is determined that a real-time message, which is assigned to the kth phase, is sent and/or received exclusively in the kth cycle. This means that specific (or specifiable) messages are only sent and/or received in each kth cycle, so that bandwidth can advantageously be saved. Similarly each of the k phases can be considered as a macrocycle, which can in turn be divided into sub-phases.

In a particularly advantageous refinement of the inventive method the scheduling of the cyclically recurring real-time data traffic and the allocation of a respective real-time message to a phase are implemented simultaneously, in other words in one step, thereby allowing the optimization potential in respect of temporal occupancy of the macrocycle with real-time messages to be fully utilized.

BRIEF DESCRIPTION OF THE DRAWINGS

The invention is described below with reference to exemplary embodiments shown in the drawings, in which.

DETAILED DESCRIPTION OF INVENTION

Figure 1:
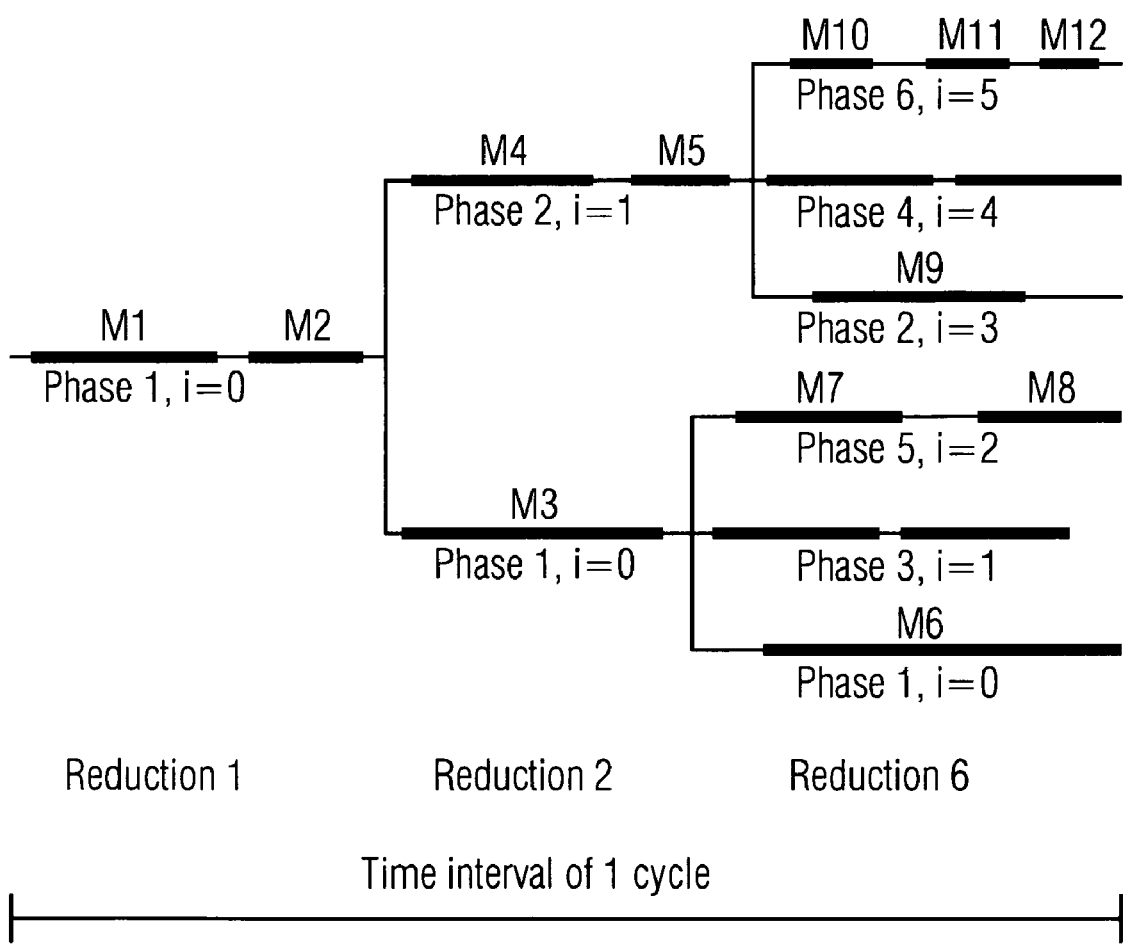
FIG. 1 shows a phase tree relating to the time interval of a single cycle.

In a real-time Ethernet, which is deployed for fast communication between components (e.g. sensors, drives, controllers) of a system, plannable messages are exchanged in a cyclical manner. For these messages it is possible to define both the paths they take from sender to recipient(s) and the time within the cycle when they pass through the switches predetermined by the path in an initialization phase in such a manner that no conflicts occur between messages. This allows a communication that is free of any non-determinism and a real-time response.

To this end the communication cycle is divided into a real-time part (RT), in which the planned messages are transmitted, and a non-real-time part (NRT), in which an unplanned message transmission can take place using conventional TCP/UDP/IP methods.

For regular messages there is one routing and one scheduling problem: planning should be effected in such a manner that the RT part occupies the smallest possible part of the overall cycle, so that enough space is available for the unplanned message transmissions.

The network now considered below is made up of switches and bi-directional links. There are up to four ports at one switch, each having an input and an output, allowing full duplex operation: when two switches A and B are connected to each other using for example the ports A,2 and B,1, a pair of links is present, which runs between the output of port A,2 and the input of port B,1, and between the input of port A,2 and the output of B,1.

Delays occur on the links, which are proportional to the length of the link. Also a specified delay is assumed for the passage of a message through a switch. A time gap is required between two messages passing through the same port of a switch, it being possible for the length of the gap to be a function of the switch type.

The topology of the network is typically extremely simple. Switches and links form ring or tree structures. However the topology of the inventive method is not limited to these simple topologies.

In the case of predetermined network elements with a specific (specifiable) topology a path through the network and the times when the message is to pass through the switches have to be defined for each message. The overall time required to send all the messages should hereby be minimized. In the routing phase one or more paths is/are defined for each message. During scheduling the times when each message passes along its path through the switch are allocated.

In addition to this scheduling information in the inventive method each message must be allocated to a phase. To save bandwidth, a message is not sent in every cycle here but only in each kth cycle, in other words the cycle is subdivided into k phases, where k is a natural number greater than 1, and the message is assigned to one of these phases. The number k is hereby referred to as a reduction. The k phases can in turn be subdivided into sub-phases. The reduction is specified by the user for each message, however the phase must be allocated by the scheduler (if it has not already been allocated previously by the user).

Conditions are shown below for the resulting routing and scheduling tasks. Essentially routing and scheduling are not tasks that are independent of each other, since decisions made in the routing phase influence scheduling quality. However for practical reasons the problem is subdivided into the two tasks of routing and scheduling. One way of taking interactions between said tasks into account is the load distribution discussed further below.

1. The Routing problem

Input information for routing is the network description and a list of messages. The sending switch and number of receiving switches are known for each message. The object is now to find the number of switches and ports, through which the message must pass, in order to arrive at its destinations.

If a message has k destinations, it can be sent from the sender simultaneously to all its recipients, it being able to follow a branching path at intermediate switches. Alternatively it can be sent in an independent manner from the sender at k different times to the k recipients. A variant between these two extremes can also be used.

In the above-mentioned PCT application WO 03/039082 it is demonstrated that the choice between these options is non-trivial and can take place in the scheduling step.

As a result of the routing the links and switches every message must pass through are known as is their arrival time at the switches. The arrival times can be calculated in a simple manner by adding together the delays at the links and switches, through which the message passes.

2. The Scheduling Problem

The object of scheduling is to assign times (in relation to the start of a cycle) for sending messages in such a manner that no conflicts occur between messages, with the overall time required to transmit all messages (transmission time) being minimized.

Due to the conditions formulated above, the send time automatically determines the arrival time at all switches used by the message or their ports. (As long as no waiting times occur at the switches.)

Possible conflicts between messages occur in switching ports of switches, since a port can only serve one message at one time.

2.1 Scheduling Restrictions

Let us consider a port output p and two messages m and n, which use this port:

The two messages are sent by their respective senders at times $t_m$ and tfl and are available at the considered ports at times $$t_{m,p} = t_m + \delta(m,p) \tag{3.1}$$

and $$t_{n,p} = t_n + \delta(n, p). \tag{3.2}$$

Here $\delta(m,p)$ is the sum of the delays between the sender of m and the port output p, as calculated during the routing. The length of these two messages is $l_m$ or, as applicable, $l_n$.

A time gap of size gap is required between two messages passing a port. A distinction has to be made between two instances:

The message m uses the port p before the message n:
Then the following must apply $$t_{n,p} \geq t_{m,p} + l_m + \text{gap} \tag{3.3}$$

or $$t_n + \delta(n,p) \geq t_m + \delta(m,p) + l_m + \text{gap} \tag{3.4}$$

or $$t_n > t_m + \delta(m,p) - \delta(n,p) + l_m + \text{gap}. \tag{3.5}$$

The message m uses the port p after the message n:
Then the following must apply $$t_m \geq t_n + \delta(n,p) - \delta(m,p) + l_n + gap \tag{3.5}$$

or $$t_n \leq t_m + \delta(n,p) + \delta(m,p) + l_n + gap. \tag{3.7}$$

Then for each pair of messages m and n, which pass the same port p, either $$t_n \geq t_m + \delta(m,p) - \delta(n,p) + l_m + gap \quad (3.8)$$

or $$t_n \leq t_m + \delta(m,p) - \delta(n,p) - l_n - gap \quad (3.9)$$

applies.

A valid system must assign send times $t_m$ to all messages m in such a manner that the two last-mentioned inequalities apply for all pairs of messages which share a common output port.

Let us now look at a port input. Essentially the same considerations apply, which result in a second pair of inequalities. If however two messages $m_i$ and $m_j$ pass the same port input, they must also have passed a common port output using a single link. Therefore the values $\delta_{i,p}$ and $\delta_{j,p}$ in the above inequalities increase by the same amount, namely the delay of said link, which results in identical inequalities. As a consequence it is not necessary to take into account resource conflicts at the port inputs; they are automatically resolved when conflicts at the port outputs are resolved by means of correct scheduling.

2.2 Macrocycles

To save bandwidth, a message is not sent in every cycle but only in every kth cycle, in other words the cycle is subdivided into k phases and the message is assigned to one of these phases. Instead of a linear time scale, this results in the concept of a phase tree, in which the messages are embedded. It should be noted here that the branching in the tree is identical for all nodes at a given level, in other words $$\frac{Reduction_{i+1}}{Reduction_i} = n_i, \text{ where } n_i \text{ is a whole number} > 1.$$

FIG. 1 shows an example of a phase tree and a numbering system for the phases. The reduction is specified in the input data for each message. The phase number is either supplied to the scheduler or defined by said scheduler. The time conditions set out above between the messages have to be observed between messages which occupy the same branch of the phase tree and between messages in one branch and its sub-branches.

The object of scheduling is now to assign a send time ti to each message $m_i$ in such a manner that the two inequalities 3.8 and 3.9 above are satisfied, with the overall time required to transmit all the messages being minimized. A phase must be assigned to each message at the same time.

The following can therefore be concluded from the example in FIG. 1: In a first cycle the messages m1, m2, m3 and m6 are sent respectively with a break in between. In a second cycle the messages m1, m2, m4, m5 and m9 are sent respectively with a break in between. In a fifth cycle the messages m1, m2, m3, m7 and m8 are sent respectively with a break in between. In a fifth cycle the messages m1, m2, m3, m7 and m8 are sent respectively with a break in between. In a sixth cycle the messages m1, m2, m4, m5, m10, m11 and m12 are sent respectively with a break in between. These messages are therefore only sent in every sixth cycle for example.

3. Algorithms and their Implementation 3.1 Software Architecture

The software is broken down into five modules: xml_reader, router, scheduler, xml_writer and graphical user interface (GUI).

Figure 2:
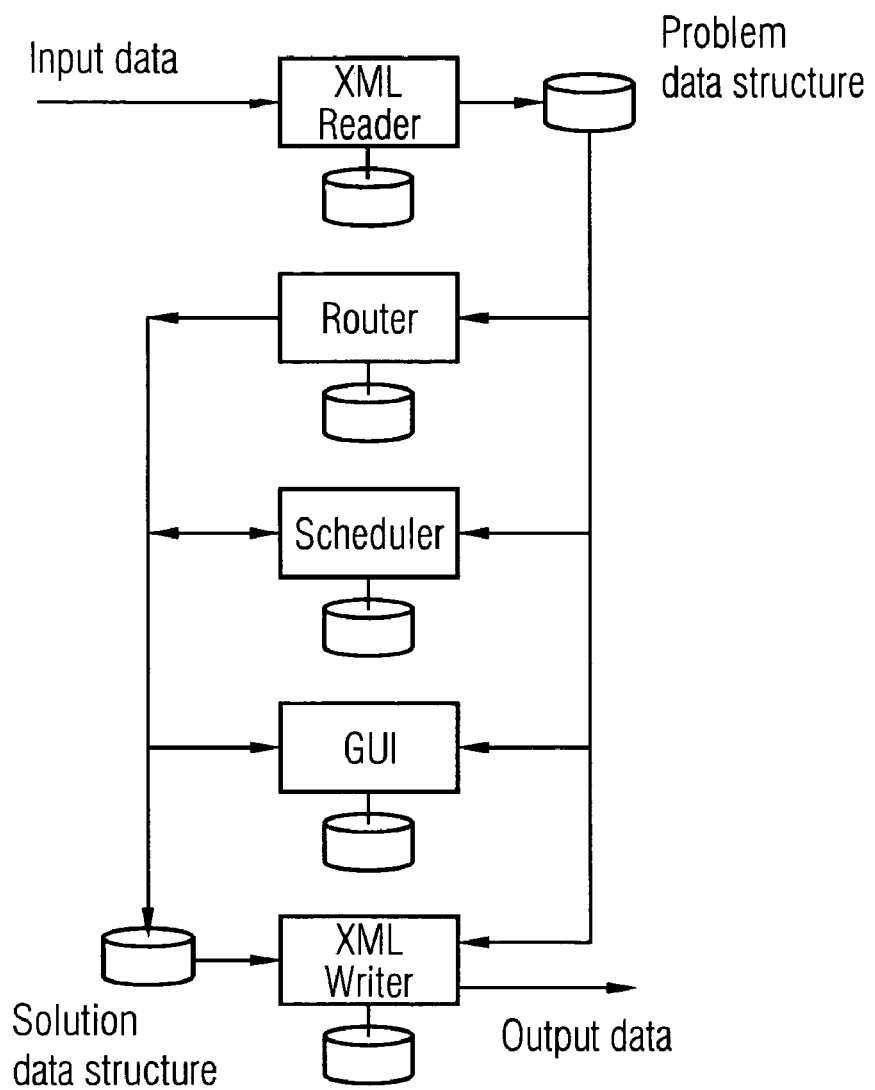
FIG. 2 shows a problem/solution pattern and a data flow.

FIG. 2 shows the data flow between said modules.

The problem/solution pattern for data structure design is used to decouple these components as far as possible. There is a (smallest possible) problem data structure (problem.h), which is generated and filled with problem data by the xml_reader. For all other modules this data structure is a read-only data structure.

The router and scheduler calculate the solution and store its (possibly) (intermediate) results in a solution data structure (solution.h). This data structure is finally read by the xml_writer, to generate an output file (xml-format).

All the modules define and use additional private data structures, which often represent extensions of the "official" problem and solution classes but can be modified independently thereof. There is generally a pointer (m_orig) in "private" classes, providing a link to the "official" version. This concept allows largely independent development and maintenance of the modules xml_reader, router, scheduler, GUI and xml_writer. This flexibility incurs a minor additional outlay in respect of storage space and time required to set up the private data structures.

The table below shows the sizes of the components

| Module | Lines | LoC |
|---|---|---|
| Problem | 576 | 467 |
| Solution | 431 | 232 |
| xml_reader | 964 | 636 |
| Router | 1486 | 1021 |
| Scheduler | 2867 | 1995 |
| GUI | 681 | 548 |
| xml_writer | 1054 | 777 |
| Main | 59 | 44 |

3.2 Central Data Structures

Before we can discuss algorithms, it is necessary to introduce central data structures. The names of the classes used in implementation are listed below and their roles and interactions set out.

It should be noted that the classes described here can be mapped onto two or more classes in the actual implementation. For reasons of simplicity, entities are described here as a class.

MsgPort describes a message passing through a port. Contains the relative arrival time of the message at the port, in other words the arrival time, when the message was sent by its sender at time 0, a pointer to the message, a pointer to its predecessor in the path and a pointer to the port. After scheduling it also contains the actual time when a message passes through the port.

Port describes a port. Points to the switch, to which it belongs, and to the connected link. Also contains a list of MsgPorts, providing access to all messages using this port. The last-mentioned information is a result of the routing phase.

Switch describes a switch. Contains the name of the switch and a list of its ports.

Link describes a link. Contains the length (delay) of the link and points to the two ports, which are connected by said link.

Message describes a message. Contains the message ID, its length, a list of sending switches, a list of receiving switches, a list of MsgPorts, providing access to all the ports passed by the message, as well as the time and phase, for which the message is planned. The list of MsgPorts is the result of the routing phase and the phase and time that of the scheduling phase.

PhaseTreeNode describes a node of the phase tree. Contains a pointer to the predecessor in the tree, the node level in the tree and its number and index in its level.

MsgPhase describes a message, which can be planned in a specific phase. Contains a pointer to a node of the phase tree and the time, for which the message can be planned, if the associated phase is used.

Component describes a context component of the restriction graph not specifically present as a data structure. Contains lists of all the messages and ports, associated with the component.

3.2.1 The Routing Graph

For the routing the network must be modeled by means of a graph. There are various ways of doing this. The most detailed way would be to introduce nodes, which model port inputs and port outputs, and to introduce oriented edges, which model links. Each link is hereby mapped into a pair of edges oriented in an anti-parallel manner, which connect the port input/output of one switch to the port output/input of another switch. Additional oriented edges are necessary to model the connectivity within a switch, resulting in 16 additional edges for every switch with 4 ports.

Such precise modeling is however not really necessary, as the delay between each pair of ports of a switch is identical and the delay on a link is identical for both directions. It is adequate to use the switch as a node and the link as an edge of a routing graph. Since all links are bidirectional, it is possible to use the non-oriented graph from the TURBO C++ class library. Since the links point to the ports, it is easy to collect the information relating to the ports through which a message passes during routing.

3.2.2 The Restriction Graph and its Components

The scheduling conditions set out above can also be modeled by means of a non-oriented graph. Nodes of this graph are messages, edges are conditions which have to be satisfied when times are assigned to the two messages. However there is no need to store this graph specifically; the essential information is contained in the MsgPorts. Generally this graph is not cohesive but breaks down into context components. For the sake of efficiency these components are first identified and the scheduling problem is handled component by component.

3.3 Processing Steps and Algorithms

3.3.1 Input Processing

The input information is indicated in an xml-file. The xml-file is parsed and interpreted by a special xml-parser, which uses the TURBO tokenizer and hash-code-based dictionaries. The parser not only checks syntactic errors but also semantic inconsistencies. When using the TURBO library it is possible to implement the parser in only around 600 code lines; it processes around 4 Mbyte/second on a 1 GHz Pentium III processor.

The result is the filled problem data structure: switch types, switches, ports, links, messages, sources (sender) and destinations (recipients).

3.3.2 Routing

3.3.2.1 Routing without Redundancy

If only one path is required between a source/destination pair of a message, it is possible to use the well-known Dijkstra's algorithm.

If a message has more than one recipient, a tree is formed of the shortest paths or a Steiner tree is formed using a Dijkstra-based heuristic.

3.3.2.2 Routing with Redundancy

Figure 3:
FIG. 3 shows a switch and two lines connected thereto.
Figure 4:
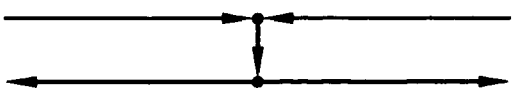
FIG. 4 shows a graph model for the flow calculation.

A refined approach is needed, if two or more resource disjoint paths are required to provide a malfunction tolerance. It would be a naïve approach to route a path first, then block the edges used by the path and finally route the second path. However this heuristic can easily fail, as discussed below. A better approach is to map the problem onto a minimal cost flow problem as follows: The network is modeled as an oriented graph, in other words each link is represented by a pair of anti-parallel edges. Switches are represented by pairs of nodes, one for incoming, the other for outgoing edges. The two nodes are connected by an additional edge, which carries the traffic passing through the node. FIGS. 3 and 4 show the transformation of a non-oriented network to an oriented flow model. FIG. 3 in particular shows a switch and two links connected thereto. FIG. 4 shows a graph model for the calculation. The capacity of all edges is set to one. If a flow with value two and minimal costs is now pushed from source to destination through this network, it is ensured that the resource-disjunction condition is satisfied both for the links and for the switches.

A plurality of standard algorithms is available to resolve this flow problem (see also R. K. Ahuja, T. L. Magnanti, J. B. Orlin: "Network Flows", Prentice Hall, 1993). The most suitable method for this application is the "successively shortest path" algorithm. The basic idea is to calculate a sequence of shortest paths between source and destination. However these paths are calculated on a "residual" network. In the first step this network is identical to the original (transformed) network, with movement along oriented edges (which carry no flow). Once a path has been found, an associated flow is received in the edges in question and no further flow can take place along said edges, since their unit capacity is exhausted. (To this extent this is like the simple path by path heuristic). However movement is possible along an exhausted edge in the "wrong" direction, with flow (and costs) being removed and therefore earlier decisions being revised.

Figure 5:
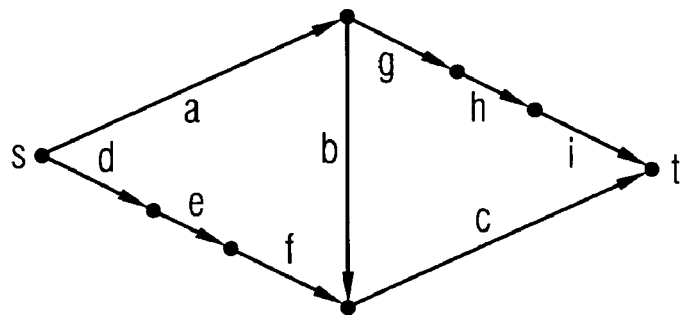
FIG. 5 shows a small empty network with nodes s and t.
Figure 6:
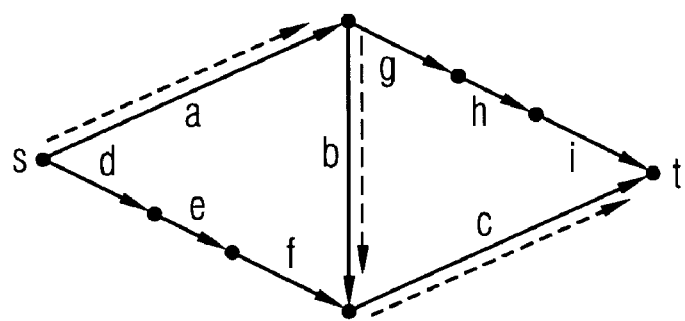
FIG. 6 shows the shortest path connecting the nodes s and t.
Figure 7:
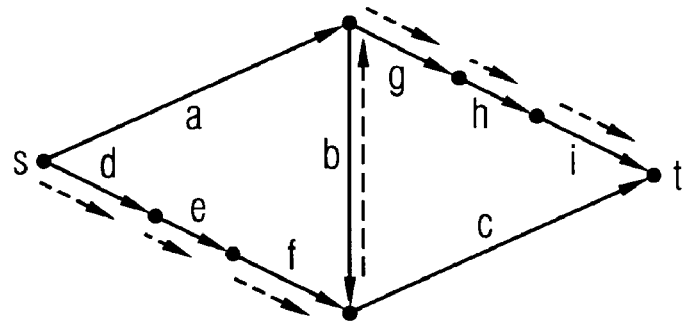
FIG. 7 shows the routing of a path crossing the edge b in the "wrong" direction.

Reference is now made to FIGS. 5 to 8, to emphasize this idea. FIG. 5 shows a small empty network with nodes s and t, which are connected by two node and edge-disjoint paths. FIG. 6 shows the first (shortest) path, which connects s and t.

No further path can now be found for a conventional shortest path algorithm, since the edges a, b and c are saturated. However it is possible in the residual network to route a path (d, e, f, b, g, h, i), which passes the edge b, in the "wrong" direction and cancel its flow.

Figure 8:
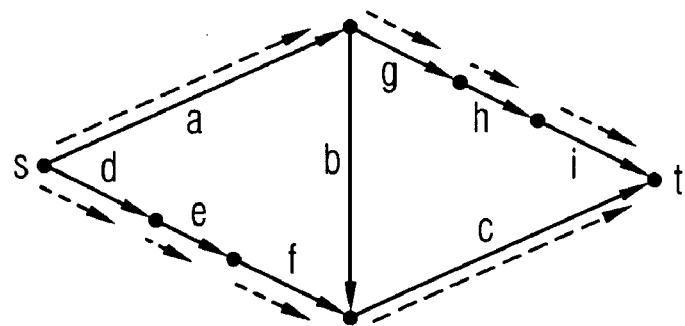
FIG. 8 shows the resulting flow pattern.
Figure 9:
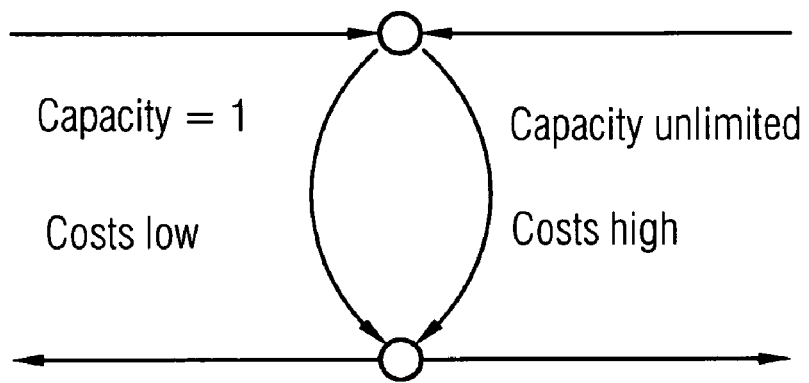
FIG. 9 shows a node model for the flow calculation.

FIG. 8 shows the resulting flow pattern. It is now possible to use any path searching algorithm, to break this flow down into (s, t) paths, finally resolving the problem.

The costs of an edge in the residual network, which is passed through backward, are negative (costs are eliminated). Therefore Dijkstra's algorithm can be used to find a shortest path (based on non-negative edge costs) only after transformation of the costs to "reduced" costs, which guarantees non-negativity for all edge costs.

Note re implementation: it is not really necessary to set up the data structures specifically according to the transformation in FIGS. 3 und 4. It is possible to code the flow in the forward direction of an original edge as positive and that in the counter direction as negative. An additional field is required in the node data structure to track the flow through the node and two distance identifiers are required per node for Dijkstra's algorithm.

The pseudo-code for a redundant path calculation is as follows:

```
route_redundant (int redundancy) {
    initialize flow to zero in all nodes and edges;
    for redundancy paths {
        find shortest path through residual network,
            using Dijkstra's algorithm;
        update flow along the path found;
        update node distance to reflect reduced costs;
    }
    decompose flow into paths using any path searching
    algorithm, moving along edges with flow only;
}
```

Further note re implementation: There should be no initialization of data structures before a path is routed (which would include passage through the entire network), only after routing and only for those parts of the network reached during the Dijkstra expansion.

For details of the concept of the residual network and reduced costs, as well as a general introduction to network flows, see also for example R. K. Ahuja, T. L. Magnanti, J. B. Orlin: "Network Flows", Prentice Hall, 1993.

A completely resource-disjoint routing cannot however always be possible (due to bottlenecks in the network topology). Nevertheless the aim here is a routing, which is "resource-disjoint as far as possible". To this end the node-internal edge in FIG. 4 is replaced by two parallel edges; one with capacity 1 and low costs, the other with unlimited capacity and high costs. This allows multiple use of a node in a minimal cost flow solution but avoids it where possible.

The increase in transit time that has to be taken into account for flow-based routing is not high. The base algorithm is very similar to that of the sequential version. It is however necessary to deal with a slightly complicated data structure and a number of edges have to be taken into account during routing (edges which could be crossed backward). The transit time is therefore roughly twice that of sequential routing.

3.3.2.3 Load Distribution

If there are alternative paths between sender and recipient of a message, an attempt is made to divide the traffic between these alternatives. This is done by using a cost function to cross an edge, taking into account the traffic load on the link. If links were to have a limited capacity capacity, the following formula could be used for the costs of an edge with length length and traffic traffic:

$$\text{cost} = \frac{\text{length}}{1 - \frac{\text{traffic}}{\text{capacity}}}$$

If the traffic on one edge approaches the capacity of said edge, the edge becomes more expensive and is avoided in future paths. There are two problems with this approach: firstly messages routed early see no traffic and always take the shortest path, while messages routed late also take diversions. Secondly there is no fixed capacity for links, which is why routing is implemented in two operations.

In the first operation the messages are routed without taking account of the traffic, in other words along shortest paths, based on the delay at edges and nodes. Then the effective traffic is determined for each link, this corresponding in principle to the sum of message lengths plus gaps between messages; since however messages can be distributed in different phases in the scheduling phase, the length of a message is divided by the number of phases permitted in its reduction level.

In the second operation the maximum effective traffic of a link is used as the capacity for all links and messages are removed from their links and rerouted using a traffic-dependent cost function, as shown above.

Depending on the command options, it is possible either to remove/reroute all messages or only those which pass through the most used link. The number of rerouting operations can likewise be monitored.

3.3.2.4 Shared Edge Use

If a message has more than one, perhaps n, recipients, it is possible either to generate a shortest path tree, which covers all recipients (the paths use edges in a shared manner), or to generate n separate shortest paths. If routing takes place with redundancy, the shared use of edges must be handled in a different manner. For each recipient r paths are generated, if r is the redundancy factor, in other words a total of m paths. An attempt is then made to recombine these paths into trees. The following piece of pseudo-code shows the method:

```
make_trees(List paths, List trees) {
    while (paths not empty) {
        delete path p from list paths;
        start a new emtpy tree t and append to list trees;
        add path p to t;
        do {
            from all remaining paths of list paths find path best,
                that matches best to tree t;
            if (matching path found) {
                delete best from list paths and
                add it to tree t;
            }
        } while (exist matching path);
    }
}
```

In the above procedure a path is matching, when it can be added to the tree without destroying tree characteristics, in other words without forming a loop, with a match being seen as all the better, the more elements it has in common with the grown tree.

3.3.2.5 Routing Results

The essential result of the routing is the MsgPort objects, which describe a message passing through a port, in other words they record the relevant message, the port passed through and the accumulated delay between the port and the end of the message. For the compacting step discussed below, it is necessary to store the predecessor in the path for each MsgPort.

Easy access is now available to all the messages passing through a given port and all ports passed through by a given message.

3.3.3 Finding Connected Components

All the scheduling algorithms discussed below have at least a complexity of order $O(n^2)$ for scheduling n messages. Processing time can therefore be gained, if the scheduling problem is divided into smaller sub-problems, which can be resolved independently of each other. Two subsets of messages MI and MJ can be scheduled independently of each other, if there is no direct or indirect condition between a message $m_i \in$ MI and a message $m_j \in$ MJ. As far as the restriction graph is concerned, this condition means that there is no path between $m_i$ and $m_j$, or equivalent thereto, $m_i$ and $m_j$ belong to different connected components of the graph.

Connected components can be found over time O(m+n) in a graph with n nodes and m edges by a simple breadth-first or depth-first search on the graph. In this instance this can take place without specific graph representation, passing through the (conceptual) graph by going from one message to all its ports and from one port to all the messages. The MsgPort lists in messages and ports allow this to be done efficiently. During this process a new component is generated, whenever the search has exhausted the current components and there are still as yet unvisited messages present. When messages and ports are passed through during the search, they are inserted into component-specific lists of messages and ports. All the algorithms discussed below operate component by component.

Below is a piece of a pseudo code, which describes how components are formed:

```
find_components( ) {
  for all messages msg, s.t. msg belongs not yet to any
  component {
    create new component c;
    insert msg into an empty queue q;
    while (q not empty) {
      pop msg from q;
      add mag to component c;
      collect all ports traversed by m;
      for all ports p collected {
        for all messages m using port p {
          append m to q, if not yet in q;
        }
      }
    }
  } // all msg
}
```

There is therefore movement in a breadth-first search from the message by way of MsgPort to the message and a new component starts when the current component cannot be expanded further.

In the true implementation the messages are distributed not only to components but also to levels of the phase tree. Each component contains a set of message lists, one list per level, so that scheduling can take place in a similar manner.

3.3.4 Initial Scheduling

In the phase-free predecessor solution a simple heuristic was used for scheduling: messages are selected using a priority system with scheduling at the earliest possible time. Once a message has been scheduled, the earliest possible time for as yet unscheduled messages and selection priorities is updated. This can be implemented using a priority queue for unscheduled messages and the restriction graph for updating the earliest possible times.

```
queue_schedule( ) {
  forall messages m
    lowest_feasible_time(m) = 0;
    insert m into priority queue;
  }
  while (queue not empty) {
    select message m to schedule from priority queue;
    delete message m from priority queue;
    schedule m at lowest feasible time;
    for all affected messages h {
      update lowest feasible time of h;
      update priority queue;
    }
  }
}
```

The priority of a message is based on its earliest possible time. Other criteria can be added. When a message m is scheduled, the earliest possible times of other messages must be increased; these messages are easy to find, by looking at the ports used by this message and the messages using these ports.

To accelerate the process, MsgPorts are removed from the lists in the ports, as soon as a message has been scheduled. (It is no longer necessary to calculate earliest possible times.)

If scheduling is incorporated in the phase concept, it is necessary to determine not only the time when a message is to be sent but also its phase. This is done in a single step. To this end an array of pointers to MsgPhase objects is retained in each message. These objects monitor the shortest possible time for a message, when said message is scheduled in a specific phase. To schedule a message and its phase a priority queue of MsgPhase objects, not messages, is now used.

The new algorithm therefore looks like this:

```
initial_schedule (int level) {
  for all messages of level {
    for all feasibe phases {
      create MsgPhase object, noting message, phase,
      and lowest feasible time;
      insert the MsgPhase into the priority queue and
      let the message point to it;
    }
  }
  while (priority queue not empty) {
    extract MsgPhase object with highest priority
    assign phase p and time t according to the MsgPhase
    object to the respective message m;
    for all other MsgPhase objects message m points to {
      delete it from the priority queue;
    }
    remove MsgPorts of m from their port lists;
    find messages affected by scheduling of m;
    (these are still unscheduled messages sharing a port with
    m)
    for all affected messages a {
      updated the lowest feasible time for scheduling
        message a in phase p;
      if (this time has changed) {
        identify the MsgPhase object that belongs to
          message a and phase p;
        update lowest feasible time and position in
          the priority queue;
      }
    }
  }
} // initial_schedule
```

The procedure shown is used for every level of the phase tree. To calculate the earliest possible time of a message m in the phase p it is also necessary to observe the topmost Msg-Port for each phase and port.

3.3.5 Iterative Scheduling Improvement

The initial system can often be improved if messages are iteratively removed and rescheduled.

3.3.6 Compaction

Until now it has been assumed that a message m passes all its ports p at the earliest possible time, in other words at time $t_{m,p} = t_m + \delta(m,p)$, if the message was scheduled at time $t_m$. However since a switch can store a message for a limited time, this condition can be tempered and flexibility can be achieved in that independent times are assigned to the MsgPorts (the objects describing a message passing through a switch). The following inequalities must still apply:

1. A message cannot be sent from a port before it has arrived at the port:

$$t_{m,p} > t_{m,pred} + \delta(m,p) - \delta(m, \text{pred})$$

Here pred is the preceding MsgPort in the message path.
2. A gap is required between two messages passing the same port:

$$t_{m,p} > t_{m_{below},p} + length(m_{below}) + gap$$

Here $m_{below}$ is the message preceding m in the port p and $length(m_{below})$ its length.
3. A message can only be stored for a limited time buffertime:

$$t_{m,p} < t_{m,pred} + \delta(m,p) - \delta(m, \text{pred}) + \text{buffertime}$$

The system of linear inequalities could be resolved by an LP solver but a simple iterative algorithm also does it. All times are first initialized to a low value, then the times are either pushed up by MsgPorts, if the first or second condition is violated, or pulled up, if the third condition is violated. As usual in longest path calculations the time allocated to an MsgPort is referred to as potential.

```
compaction( ) {
  for all MsgPorts mp initialize pot(mp);
  stable = false;
  while (not stable) {
    stable = true;
    // push:
    for all MsgPorts mp {
      if (Condition_1 is violated) {
        increase pot(mp); stable = false;
      }
      if (Condition_2 is violated) {
        increase pot(mp); stable = false;
      }
    }
    // pull:
    for all MsgPorts mp {
      if (Condition_3 is violated) {
        increase pot(pred(mp)); stable = false;
      }
    }
  }
}
```

This algorithm ends when a possible solution is found; the existence of a possible solution is obvious: it is the one achieved when messages in switches are forwarded without delay. The initialization step is simple, when it has to be done with the lowest value of the phase tree: initialization to zero. At higher levels of the phase tree the initial value is a function of the port and phase; it is derived from the highest MsgPort in that port in the previous non-empty level. Therefore compaction must be implemented level by level.

3.3.7 Upward Displacement

The user may want messages to be scheduled as late as possible. To achieve this, a method similar to compaction is used. There are only three modifications:
1. The process is again implemented level by level but going downward.
2. MsgPorts are initialized to highest possible values.
3. Potentials are reduced until all the above-mentioned conditions are satisfied.

3.3.8 Scheduling in the Presence of Fixed Times

If one or more messages is/are assigned to a fixed time, the algorithms discussed up to this point must be modified.

During the initial scheduling these messages are scheduled in advance for their fixed time and phase. If a free message is scheduled at a time t, it is first checked whether this time produces a conflict with one of the fixed messages for the same phase; if so, the permissible time for the message is increased correspondingly and it is displaced backward in the priority queue for later processing.

The scheduling improvement step is bypassed for phases containing fixed messages, since the scheduling improvement algorithm is based on the ability of messages to move freely in time. It could therefore be advantageous to collect fixed messages in just one single phase.

Compaction and upward displacement are easily tailored to fixed messages; they are simply not moved.

3.4 Overall Scheduling Sequence

The overall sequence of scheduling algorithms is shown here:

```
schedule( ) {
  find_components( );
  for all components {
    for all levels of the phase tree {
      calculate initial schedule and assign phases;
      for all phases of this level {
        improve schedule by swapping of messages;
        apply the compaction algorithms;
      }
    }
  }
  if (late scheduling requested) {
    find maximum make span (looking at all components);
    for all components {
      for all levels going down {
        for all phases of level {
          apply the shift_up algorithm;
        }
      }
    }
  }
} // schedule
```

4. Results

The algorithms discussed are now demonstrated based on a small example, then the results of a real example are shown.

4.1 Small Example

Figure 10:
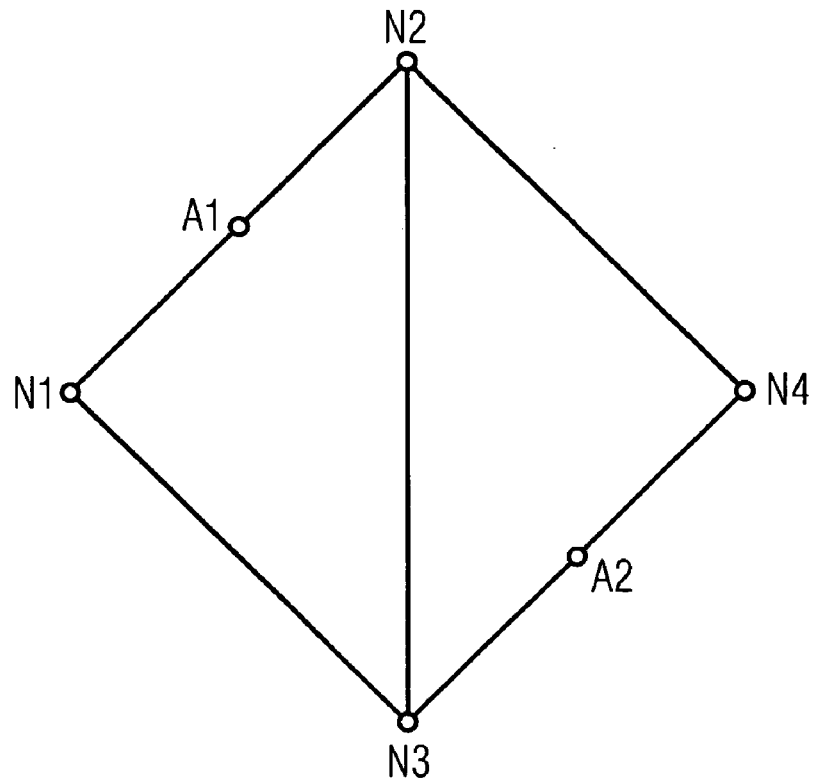
FIG. 10 shows a topology of a small example.

Reference is now made to FIG. 10, in which a topology of the small example is shown. The table below describes the messages to be routed and scheduled:

| Message | Sender | Recipient/Redundancy | Reduction | Edge share |
|---|---|---|---|---|
| 0 | N1 | N4/2 N2/2 | 1 | True |
| 1 | N1 | N4/2 N2/2 | 1 | false |
| 2 | N1 | N4/1 N2/1 | 1 | false |
| 3 | N1 | N2/1 N3/1 | 3 | True |
| 4 | N1 | N2/1 N3/1 | 15 | false |
| 5 | N1 | N2/1 N3/1 | 15 | false |
| 6 | N1 | N3/1 | 15 | false |

Figure 11:
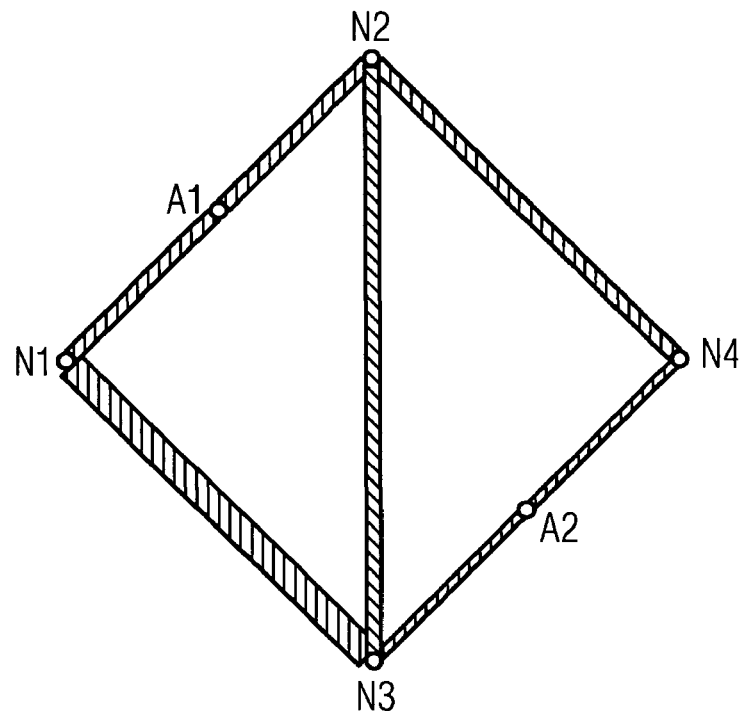
FIG. 11 shows a routing of the small example.
Figure 12:
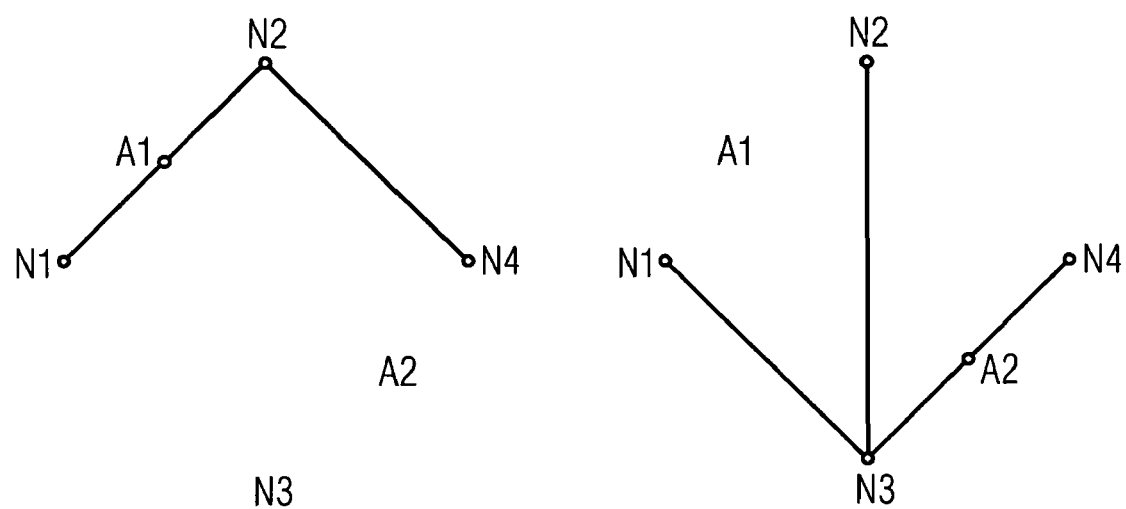
FIG. 12 shows the division of a message 0 into two branches.

Reference is now made to FIG. 11, which shows the routing of the small example. Because of the edge share, the message 0 can be routed in a redundant route using two trees (see also FIG. 12).

Message 1, with ShareEdges=false, requires 3 paths to connect the recipient in a redundant route. The resulting routing pattern is the same as the one in FIG. 12, but the link N1->N3 is used twice.

Figure 13:
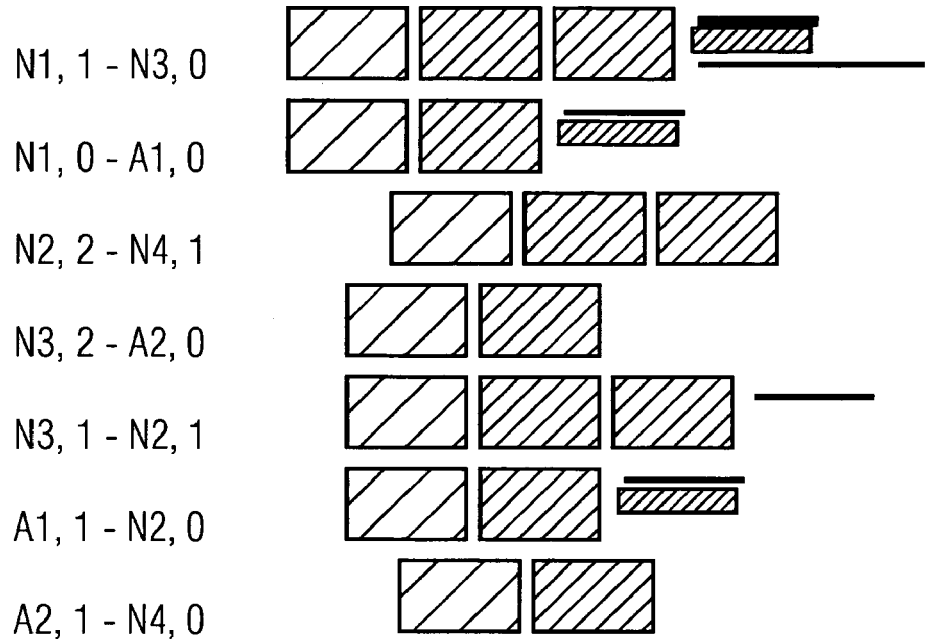
FIG. 13 shows the scheduling of the small example.

Reference is now made to FIG. 13, which shows the resulting time schedule. The time schedule is shown as a modified Gantt diagram: for each port the assigned messages are shown according to the time when they occupy the port (the horizontal axis of the diagram represents the time). For messages with a reduction greater than 1 the vertical axis is subdivided according to the number of phases per port; the diagram therefore reflects the phase tree in FIG. 1. The larger gap should be noted, where one message with reduction 1 and a further message with reduction 15 are adjacent to the port N1,0. This results from the AdditionalReductionGap parameter.

Figure 14:
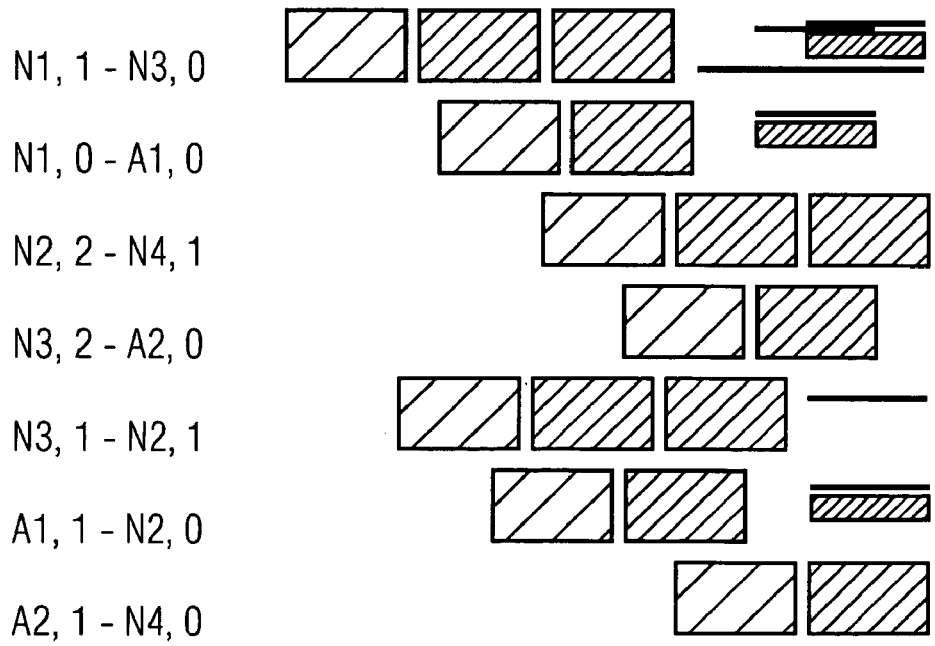
FIG. 14 shows the scheduling messages.

If we also set the StartAlignedBorder parameter to false, the messages are moved as far as possible upward within the overall time interval (FIG. 14).

4.2 A Real Example

The algorithms described have been tested using a real example of a train with four railcars.

Figure 15:
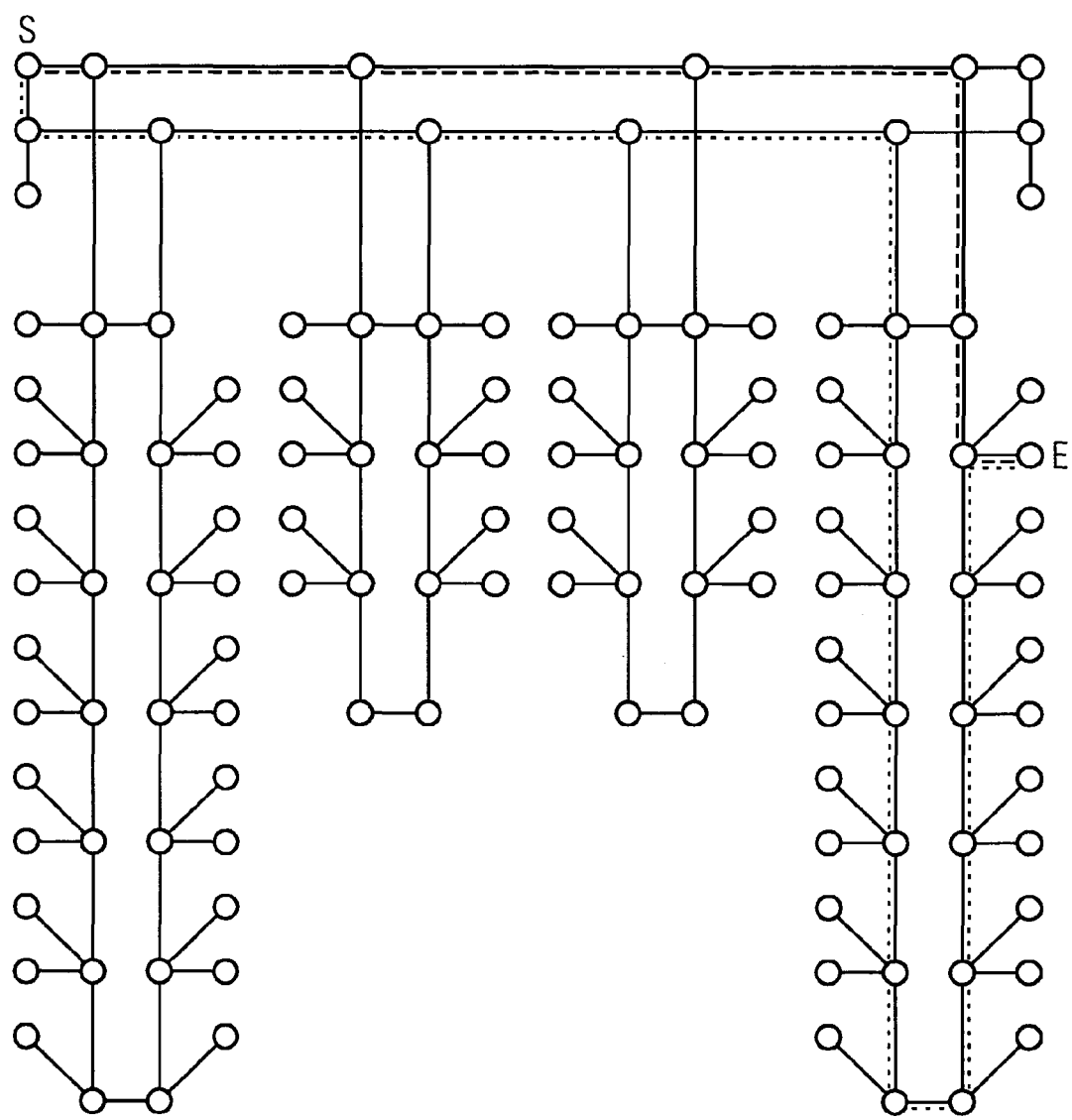
FIG. 15 shows a real example.

Reference is now made to FIG. 15, which shows the associated network with switches and links of the train with four railcars before routing.

Figure 16:
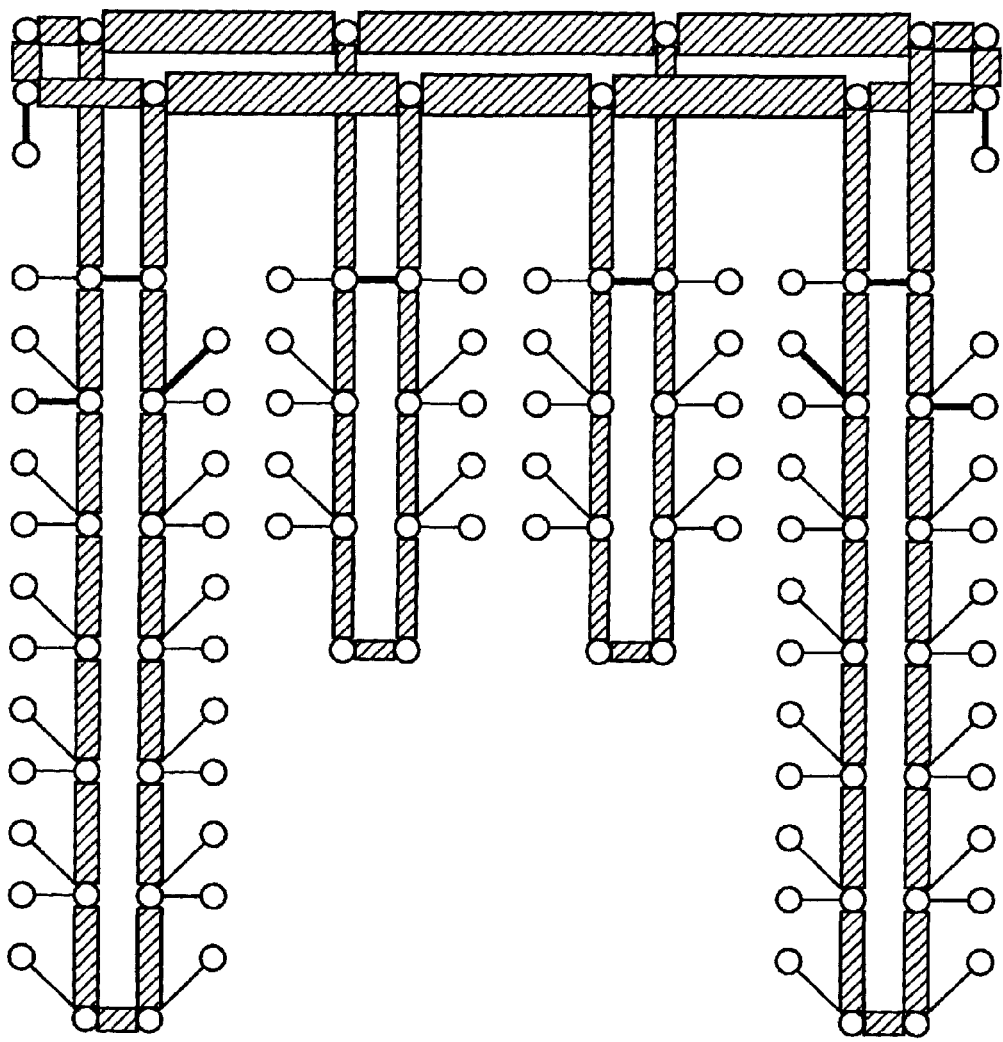
FIG. 16 shows a network after the routing.

Reference is now made to FIG. 16, which shows the situation after routing. The breadth of the links indicates the extent of the traffic flowing through the links.

Figure 17:
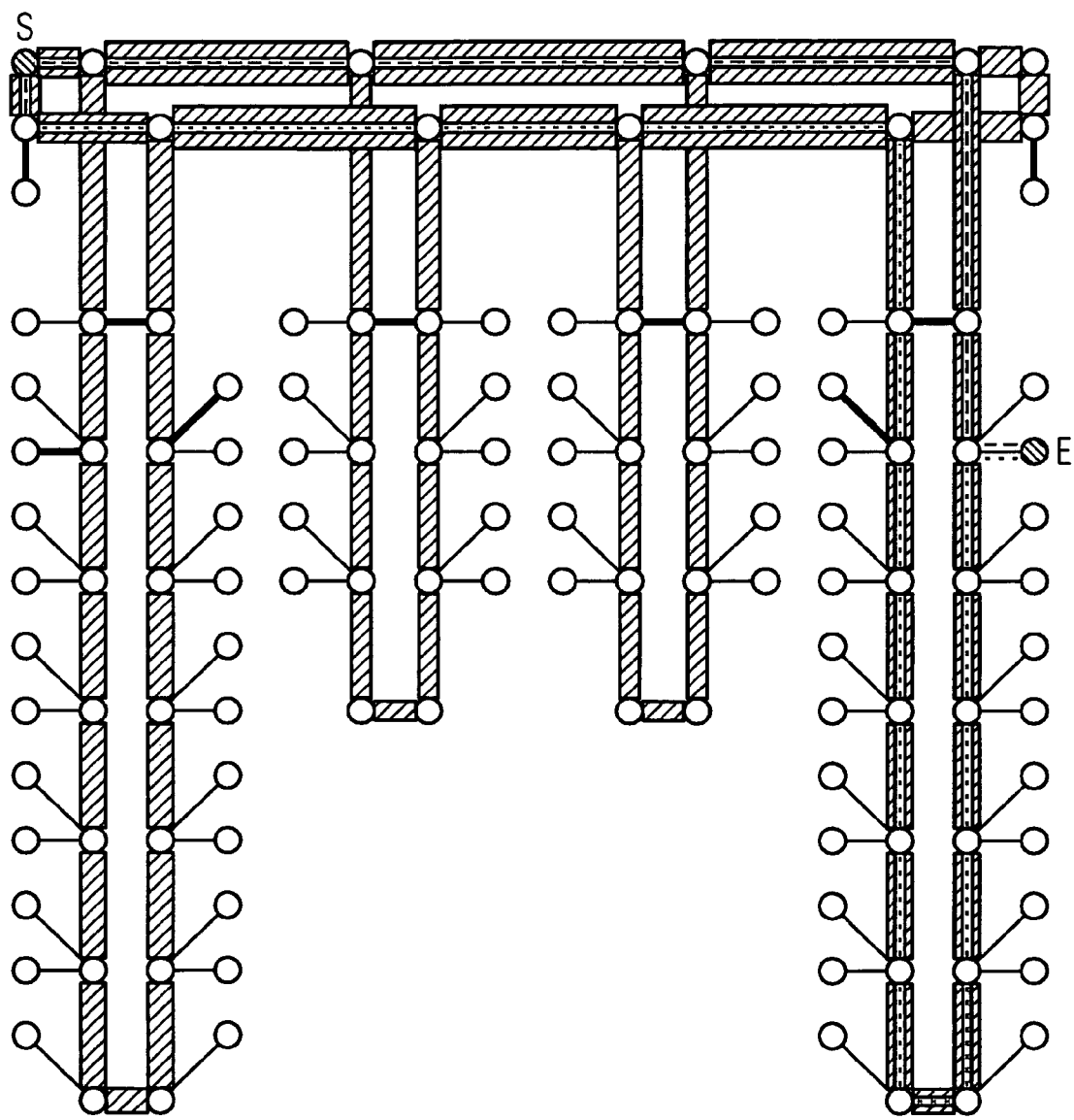
FIG. 17 shows the routing of an individual message.

Reference is now made to FIG. 17, which shows the routing of a single message. The sender is designated as S, the recipient E. One path is shown with a dashed line, the other with a dotted line. A routing of two resource-disjoint paths was required but this is not completely possible because of the bottleneck close to the recipient (immediately before the recipient both paths have a common pattern).

4.2.1 Load Distribution

To demonstrate the effectiveness of load distribution, two additional links were added to the topology of the example shown.

Figure 18:
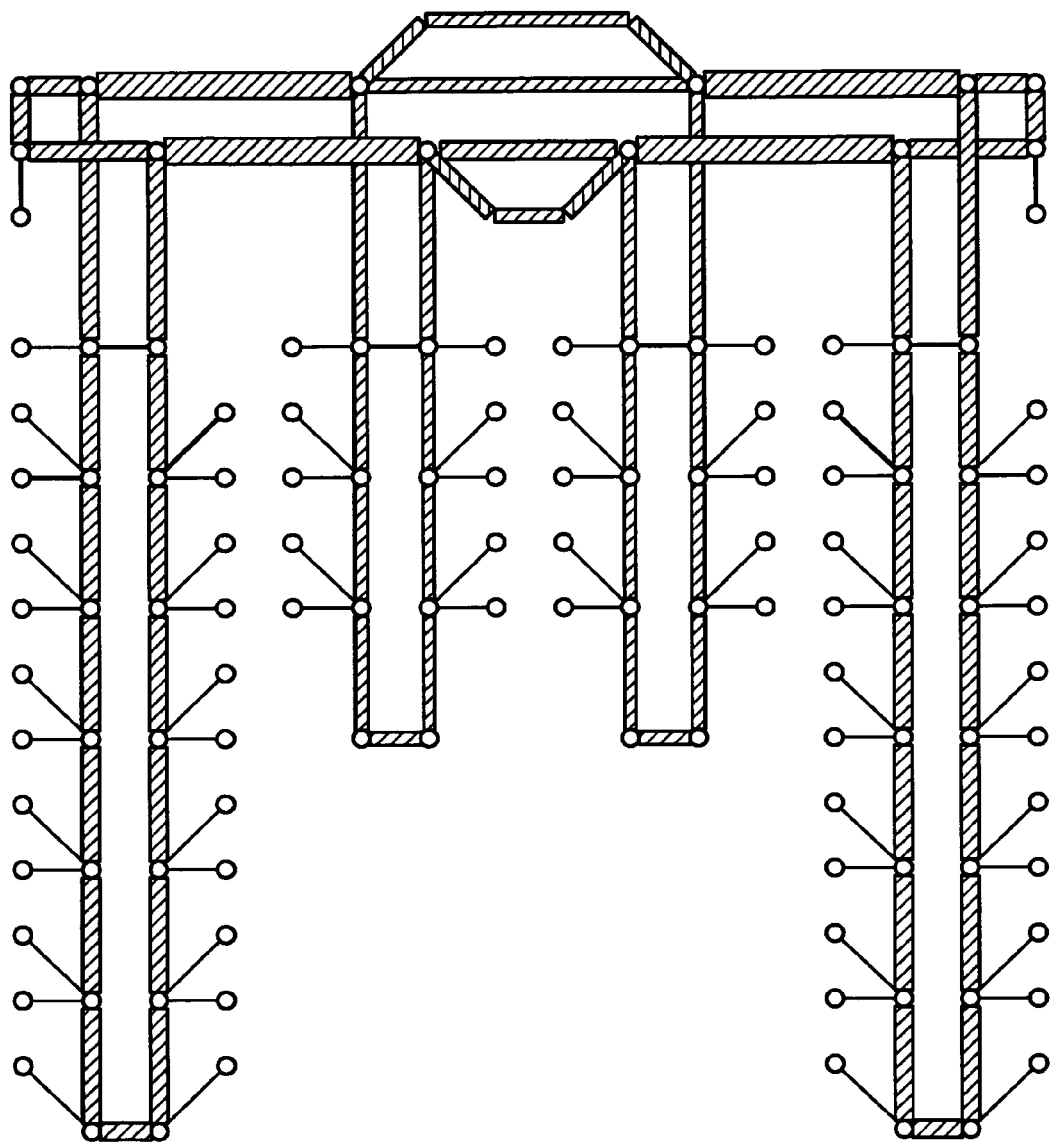
FIG. 18 shows the routing with two additional links.

Reference is now made to FIG. 18, which shows routing with two additional links. FIG. 18 shows how the traffic is distributed between the now parallel links in the main loop, with the extent of the traffic being shown by the thickness of the links.

4.2.2 Shared Edge Use

In the example there is a synchronization message, which is sent from a main controller to 61 recipients with redundancy 2. Therefore 122 paths are initially generated by the flow-based routing algorithm. These are then collapsed by the described edge use mechanism into two trees. If shared edge use is not permitted, the number of trees remaining is 24, not 122, since many paths overlap each other completely and can therefore be eliminated.

4.2.3 Transit Times

The table below collates the CPU times required for the various processing steps using a 1.7 GHz Pentium 4 processor:

| | |
|---|---|
| CPU-time for xml_reader | 0.020 |
| CPU-time for routing | 0.170 |
| CPU-time for scheduling | 0.260 |
| CPU-time for xml_writer | 0.170 |

The invention claimed is:

1. A method of communication based upon a real-time data traffic in a collision-avoiding communication network, comprising:

prior to commencing a cyclically recurring real-time data traffic on a communication network, wherein the real-time data traffic has real-time messages communicated in one or more of a number of cycles within a macrocycle;

(a) determining data paths for routing the cyclically recurring real-time data traffic for the real-time messages in the communication network;

(b) scheduling the cyclically recurring real-time data traffic based on the data paths determined to establish send times for the real-time messages, wherein the scheduling further comprises subdividing the macrocycle into k phases ($Phase_1$, $Phase_2$, ... $Phase_k$) wherein k corresponds to the number of successive cycles of the macrocycle, where k is a natural number greater than 1, and wherein each phase ($Phase_1$, $Phase_2$, ... $Phase_k$) of the k phases defines the number of times a real-time message allocated to that phase is transmitted, such that a $Phase_1$ message is transmitted every 1 cycle of the macrocycle, a $Phase_2$, message is transmitted every 2 cycles of the macrocycle, continuing to a $Phase_k$ message transmitted every kth cycle of the macrocycle; and (c) allocating each of the real-time messages based on a reduction specified for each message to one of the k phases so that each of the real-time messages is sent every kth cycle in accordance with its reduction and phase allocation ($Phase_1$, $Phase_2$, ... $Phase_k$), rather than every cycle in the macrocycle.

2. The method as claimed in claim 1, wherein the routing of the cyclically recurring real-time data traffic is based upon a determination of an economical data path.

3. The method as claimed in claim 2, wherein the allocation of the respective real-time message to the phase is made during a configuration stage of the communication network.

4. The method as claimed in claim 1, wherein the scheduling of the cyclically recurring real-time data traffic and the allocation of each of the real-time messages to one of the k phases take place simultaneously.

5. The method as claimed in claim 4, wherein an occupancy of the macrocycle with messages is minimized based on the reduction specified for each message so that a plurality of messages are sent only every kth cycle in accordance with the message's respective reduction rather than every cycle in the macrocycle.

6. The method as claimed in claim 5, wherein a phase is subdivided into a number of sub-phases, wherein the number of sub-phases is a natural number greater than 1.

7. The method as claimed in claim 4, wherein a phase is subdivided into a number of sub-phases, wherein the number of sub-phases is a natural number greater than 1.

8. The method as claimed in claim 1, wherein an occupancy of the macrocycle with messages is minimized based on the reduction specified for each message so that a plurality of messages are sent only every kth cycle in accordance with the message's respective reduction rather than every cycle in the macrocycle.

9. The method as claimed in claim 8, wherein a phase is subdivided into a number of sub-phases, wherein the number of sub-phases is a natural number greater than 1.

10. The method as claimed in claim 1, wherein a phase is subdivided into a number of sub-phases, wherein the number of sub-phases is a natural number greater than 1.

11. A non-transitory computer readable medium encoded with executable software comprising a method for:

prior to commencing a cyclically recurring real-time data traffic on a communication network, wherein the real-time data traffic has real-time messages communicated in one or more of a number of cycles within a macrocycle;

(a) determining data paths for routing of the cyclically recurring real-time data traffic for the real-time messages in the communication network;

(b) scheduling of the cyclically recurring real-time data traffic based on the data paths determined to establish send times for the real-time messages, wherein the scheduling further comprises subdividing the macrocycle into k phases ($Phase_1$, $Phase_2$, ... $Phase_k$) wherein k corresponds to the number of successive cycles of the macrocycle, where k is a natural number greater than 1, and wherein each phase ($Phase_1$, $Phase_2$, ... $Phase_k$) of the k phases defines the number of times a real-time message allocated to that phase is transmitted, such that a $Phase_1$ message is transmitted every 1 cycle of the macrocycle, a $Phase_2$, message is transmitted every 2 cycles of the macrocycle, continuing to a $Phase_k$ message transmitted every kth cycle of the macrocycle; and (c) allocating each of the real-time messages based on a reduction specified for each message to one of the k phases so that each of the real-time messages is sent every kth cycle in accordance with its reduction and phase allocation ($Phase_1$, $Phase_2$, ... $Phase_k$, rather than every cycle in the macrocycle.

12. The computer readable medium as claimed in claim 11, wherein the routing of the cyclically recurring real-time data traffic is based upon a determination of an economical data path.

13. The computer readable medium as claimed in claim 12, wherein the allocation of the respective real-time message to the phase is made during a configuration stage of the communication network.

14. The computer readable medium as claimed in claim 13, wherein the scheduling of the cyclically recurring real-time data traffic and the allocation of each of the respective real-time messages to one of the k phases take place simultaneously.

15. The computer readable medium as claimed in claim 14, wherein an occupancy of the macrocycle with messages is minimized based on the reduction specified for each message so that a plurality of messages are sent only every kth cycle in accordance with the message's respective reduction rather than every cycle in the macrocycle.

* * * * *